United States Patent
Koseki et al.

(10) Patent No.: US 12,055,922 B2
(45) Date of Patent: Aug. 6, 2024

(54) ANALYSIS SYSTEM AND ANALYSIS METHOD

(71) Applicant: JFE STEEL CORPORATION, Tokyo (JP)

(72) Inventors: Shinji Koseki, Tokyo (JP); Masaru Fukumura, Tokyo (JP); Hiroyasu Shigemori, Tokyo (JP); Shiguma Uno, Tokyo (JP); Noriko Ozawa, Tokyo (JP); Toshito Takamiya, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 295 days.

(21) Appl. No.: 17/423,111

(22) PCT Filed: Jan. 8, 2020

(86) PCT No.: PCT/JP2020/000345
§ 371 (c)(1),
(2) Date: Jul. 15, 2021

(87) PCT Pub. No.: WO2020/149198
PCT Pub. Date: Jul. 23, 2020

(65) Prior Publication Data
US 2022/0091597 A1 Mar. 24, 2022

(30) Foreign Application Priority Data
Jan. 15, 2019 (JP) .................................. 2019-004346

(51) Int. Cl.
*G05B 19/418* (2006.01)
(52) U.S. Cl.
CPC ............... *G05B 19/41875* (2013.01); *G05B 2219/32368* (2013.01)

(58) Field of Classification Search
CPC ............... G05B 19/41875; G05B 2219/32368
See application file for complete search history.

(56) References Cited

U.S. PATENT DOCUMENTS

| | | |
|---|---|---|
| 4,905,753 A | 3/1990 | Shio et al. |
| 5,511,004 A | 4/1996 | Dubost et al. |
| (Continued) | | |

FOREIGN PATENT DOCUMENTS

| | | |
|---|---|---|
| CN | 1740934 A | 3/2006 |
| CN | 101842685 A | 9/2010 |
| (Continued) | | |

OTHER PUBLICATIONS

May 11, 2022, Office Action issued by the Federal Service for Intellectual Property, Patents and Trademarks of the Russian Federation in the corresponding Russian Patent Application No. 2021123996 with English language search report.

(Continued)

*Primary Examiner* — Thomas C Lee
*Assistant Examiner* — Ameir Myers
(74) *Attorney, Agent, or Firm* — KENJA IP LAW PC

(57) ABSTRACT

An analysis system 10 includes: an operational data acquisition unit 11 that acquires operational data including an operational state of a production line 20; a product information acquisition unit 13 that acquires a state of a product manufactured in the production line and outputs the state of the product as product information; a production state analyzer 12 that obtains a predetermined physical quantity of the product on a basis of the operational data acquired by the operational data acquisition unit 11 and outputs the predetermined physical quantity as information on the physical quantity; and a correlation analyzer 14 that performs analysis of a correlation between the information on the physical quantity and the product information.

9 Claims, 4 Drawing Sheets

(56) References Cited

U.S. PATENT DOCUMENTS

| | | | |
|---|---|---|---|
| 7,209,846 B2 | 4/2007 | Tamaki et al. | |
| 2005/0131572 A1* | 6/2005 | Broese | G05B 13/042 |
| | | | 700/148 |
| 2006/0047454 A1 | 3/2006 | Tamaki et al. | |
| 2009/0084517 A1* | 4/2009 | Thomas | B22D 11/16 |
| | | | 164/413 |
| 2010/0217540 A1 | 8/2010 | Namba et al. | |
| 2010/0275575 A1* | 11/2010 | Brown | F02C 9/00 |
| | | | 60/233 |
| 2014/0084939 A1 | 3/2014 | Sejima et al. | |
| 2017/0002440 A1* | 1/2017 | Sprock | B21B 37/74 |
| 2018/0267522 A1 | 9/2018 | Kawai et al. | |

FOREIGN PATENT DOCUMENTS

| | | |
|---|---|---|
| CN | 102395929 A | 3/2012 |
| CN | 103488135 A | 1/2014 |
| CN | 103675697 A | 3/2014 |
| CN | 103722022 A | 4/2014 |
| EP | 3410245 A1 | 12/2018 |
| JP | S6085341 A | 5/1985 |
| JP | H01104449 A | 4/1989 |
| JP | 2001025805 A | 1/2001 |
| JP | 3289822 B2 | 6/2002 |
| JP | 2006065598 A | 3/2006 |
| JP | 2008291362 A | 12/2008 |
| JP | 2009249712 A | 10/2009 |
| JP | 5003483 B2 | 8/2012 |
| JP | 2013194318 A | 9/2013 |
| JP | 5453728 B2 | 3/2014 |
| JP | 5460355 B2 | 4/2014 |
| JP | 5929151 B2 | 6/2016 |
| RU | 123557 U1 | 12/2012 |
| SU | 1376102 A1 | 2/1988 |

OTHER PUBLICATIONS

Apr. 6, 2021, Decision of Refusal issued by the Japan Patent Office in the corresponding Japanese Patent Application No. 2020-518750 with English language Concise Statement of Relevance.

Dec. 8, 2020, Notification of Reasons for Refusal issued by the Japan Patent Office in the corresponding Japanese Patent Application No. 2020-518750 with English language Concise Statement of Relevance.

Mar. 17, 2020, International Search Report issued in the International Patent Application No. PCT/JP2020/000345.

May 3, 2022, the Extended European Search Report issued by the European Patent Office in the corresponding European Patent Application No. 20741129.9.

Dec. 28, 2023, Office Action issued by the China National Intellectual Property Administration in the corresponding Chinese Patent Application No. 202080008201.X with English language concise statement of relevance.

Dec. 5, 2023, Office Action issued by the Korean Intellectual Property Office in the corresponding Korean Patent Application No. 10-2021-7024085 with English language concise statement of relevance.

* cited by examiner

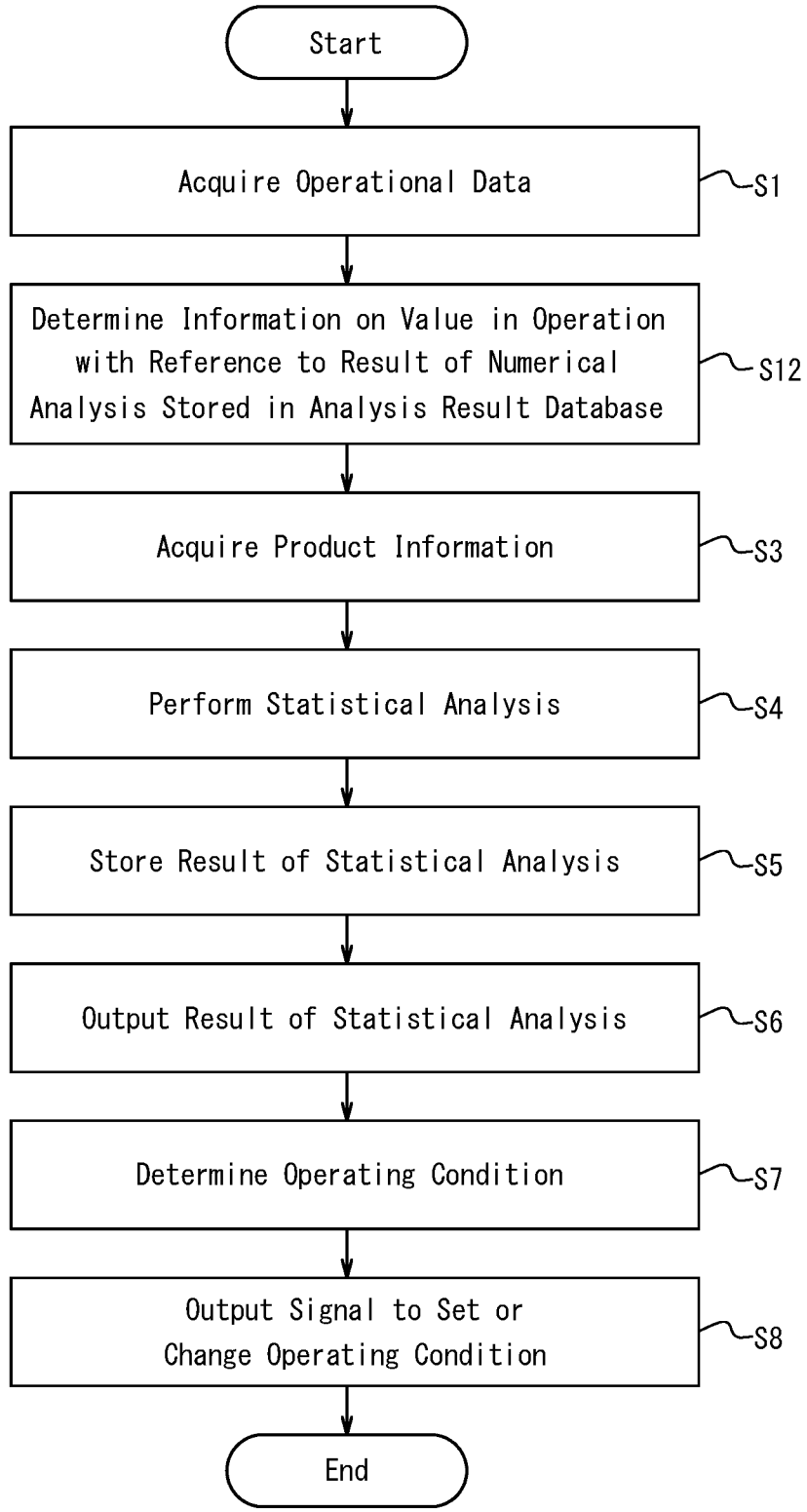

ANALYSIS SYSTEM AND ANALYSIS METHOD

CROSS REFERENCE TO RELATED APPLICATIONS

This application claims priority to Japanese Patent Application No. 2019-004346 (filed on Jan. 15, 2019), and the entire contents of which are hereby incorporated by reference.

TECHNICAL FIELD

This disclosure relates to an analysis system and an analysis method that perform numerical analysis on a basis of operational data relating to an operational state of a production line, and further perform statistical analysis on a basis of the results of the numerical analysis and the state of a product manufactured in the production line.

BACKGROUND

In production lines for industrial use, for example, it is common practice to collect and record operational data of the production line in the manufacturing process. The operational data is data relating to the operational state of the production line, and includes, for example, information on various physical quantities indicating the state of the production line and information on various operating conditions set in the production line. The operational data is used for quality control by identifying abnormalities in the manufacturing conditions when a defect occurs in a manufactured product, or for improving the operation by performing statistical analysis to investigate the effect of the operating conditions set in the production line on the product characteristics.
Such operational data is also used to investigate the causes of troubles during manufacture and to maintain the production line.

Currently, there are various methods for statistical analysis, ranging from simple regression analysis to applied methods using machine learning. In recent years, with the increasing focus on big data analysis, the scale of the data handled has increased and the algorithms for data analysis have become more sophisticated.

However, there is not necessarily a correlation between operational data and the cause of a defect in a manufactured product or a trouble during manufacture, and it may be difficult to identify the causes of such defects or troubles simply by referring to the operational data.

On the other hand, as a tool different from statistical analysis, numerical analysis is also widely used to improve operations. Numerical analysis reproduces phenomena and calculates physical quantities by performing operations using physical models. Numerical analysis does not require any experimental equipment, and the analysis results can be obtained relatively quickly at low cost. In addition, numerical analysis provides a high degree of freedom because, for example, the operating conditions of the operation line for numerical analysis can be easily changed to perform the analysis. In addition, numerical analysis can reproduce (guess) the state of places that are difficult to measure or visualize with actual equipment, and can acquire physical quantities as data that is difficult to measure with sensors or other measurement devices. For example, in the steelmaking process, it is difficult to install measurement devices in a converter because it is in a harsh environment with high temperature. However, by using numerical analysis, it is possible to calculate and visualize the distribution of physical quantities that are difficult to measure with measurement devices, such as molten steel flow, gas flow rate, and carbon monoxide concentration.

Since numerical analysis is based on a physical model as described above, the more complex the physical model is, the more sophisticated the calculation becomes and the computational cost can increase. However, recent improvements in computer performance have expanded the range of applicability of numerical analysis.

As an example, it is known that numerical analysis can be applied to the steelmaking process.

For example, JP2001-25805A (PTL 1) describes a technique for visualizing the rolling processes of steel materials by performing numerical analysis using operational data. In PTL 1, temperature distribution, stress, and the like of the steel material during rolling are calculated by numerical analysis.

In addition, JP5929151B (PTL 2) describes a method for estimating the optimum load in rolling. In the method described in PTL 2, a database of numerical analysis results is made by performing numerical calculations in advance using numerical analysis method such as the finite element method, and the optimum load is determined by extracting appropriate numerical analysis results from the database for each operating condition.

In addition, JP3289822B (PTL 3) describes a method of using a database of numerical analysis results to control the operation of a heating furnace. In the method described in PTL 3, numerical analysis using actual operation results is executed in advance, and the numerical calculation results calculated under the conditions closest to the operating conditions are extracted from the database when a heating furnace is operated. In the selection of the operating conditions to be extracted, proximity is used as an indicator. In the method described in PTL 3, the weighting is based on the proximity.

In addition, JP2008-291362A (PTL 4) describes the operation of blowing diluted gaseous fuel into a sintering machine by performing calculations in advance and statistically processing the calculation results in advance.

CITATION LIST

Patent Literature

PTL 1: JP2001-25805A
PTL 2: JP5929151B
PTL 3: JP3289822B
PTL 4: JP2008-291362A

SUMMARY

Technical Problem

When statistical analysis is performed, data that serve as the basis for analyzing correlations (hereinafter also referred to as "basic data") are required, and the greater the amount and type of basic data, the more likely it is that highly accurate statistical analysis results will be obtained. However, in actual operation, it may not be possible to obtain the necessary basic data. For example, depending on the location of the production line and the location of the apparatus in which measurement devices are to be installed, it may not be possible to install the measurement devices. In addition, the number of measurement devices that can be installed may be limited by the conditions of the production line and apparatus. In the case where the number of measurement devices that can be installed is limited, a sufficient amount of basic data cannot be obtained, and spatial distribution information may not be known for the physical quantity to be measured.

In addition, some physical quantities may be difficult to measure with measurement devices. For example, physical quantities such as density, stress, and concentration may be difficult to obtain by measurement. Furthermore, for example, when making predictions concerning operating conditions that differ significantly from the actual operating conditions, it is difficult to make predictions by statistical analysis unless there are data similar to the changed operating conditions.

The inventions described in PTLs 1 to 4 use the results predicted on a basis of numerical analysis executed in advance. However, it is not always possible to make highly accurate predictions by numerical analysis because the actual phenomena include various factors that may vary.

As mentioned above, statistical analysis is capable of making predictions with relatively high accuracy when huge amounts of data are used. However, in statistical analysis, it is difficult to analyze physical quantities that are difficult to measure with measurement devices, and even for physical quantities that can be obtained by measurement, it is difficult to make predictions for the range where no data is available. On the other hand, numerical analysis can reproduce the state or calculate the data for the range where actual measurement cannot be performed with measurement devices.

It would thus be helpful to provide an analysis system and an analysis method capable of performing more accurate analysis and analyzing a correlation between operational data and a defect of a product or a cause of a defect that has occurred during manufacture.

Solution to Problem

As a result of our diligent study to address the above issues, it was revealed that the data necessary for statistical analysis can be supplemented by predicting a state or calculating a state as data by numerical analysis using a physical model for the range that cannot be actually measured with measurement devices or for the physical quantity that is difficult to be measured with measurement devices, and as a result, it is possible to estimate more accurately the cause of a defect in a product or a trouble during manufacture. The present disclosure was completed based on these discoveries.

An analysis system according to an embodiment of the present disclosure comprises: an operational data acquisition unit that acquires operational data including an operational state of a production line; a product information acquisition unit that acquires a state of a product manufactured in the production line and outputs the state of the product as product information; a production state analyzer that obtains a predetermined physical quantity of the product on a basis of the operational data acquired by the operational data acquisition unit and outputs the predetermined physical quantity as information on the physical quantity; and a correlation analyzer that performs analysis of a correlation between the information on the physical quantity and the product information.

In the analysis system according to an embodiment of the present disclosure, the production state analyzer executes numerical analysis of the predetermined physical quantity using a physical model on a basis of the operational data acquired by the operational data acquisition unit, and outputs a result of the executed numerical analysis as information on the physical quantity.

The analysis system according to an embodiment of the present disclosure further comprises: an analysis result database that stores a result of numerical analysis of the predetermined physical quantity executed in advance using a physical model on a basis of the operational data of the production line, wherein the production state analyzer determines the information on the physical quantity using the result of the numerical analysis stored in the analysis result database on a basis of the operational data acquired by the operational data acquisition unit, and outputs the information on the physical quantity determined.

In the analysis system according to an embodiment of the present disclosure, the production state analyzer performs a weighted calculation on each of a plurality of the results of the numerical analysis stored in the analysis result database on a basis of the operational data acquired by the operational data acquisition unit to determine the information on the physical quantity.

The analysis system according to an embodiment of the present disclosure further comprises an analysis result storage that stores a result of the analysis of the correlation by the correlation analyzer.

In the analysis system according to an embodiment of the present disclosure, the product information includes information on the quality of the product.

In the analysis system according to an embodiment of the present disclosure, the production state analyzer and the correlation analyzer are mounted on different independent devices.

In the analysis system according to an embodiment of the present disclosure, the production state analyzer and the correlation analyzer are mounted on a single device.

For example, an analysis method according to an embodiment of the present disclosure is an analysis method executed by an analysis system comprising: acquiring operational data including an operational state of a production line; acquiring a state of a product manufactured in the production line; outputting the state of the product as product information; obtaining a predetermined physical quantity of the product on a basis of the operational data acquired; outputting the predetermined physical quantity as information on the physical quantity; and performing analysis of a correlation between the information on the physical quantity and the product information.

Advantageous Effect

According to embodiments of the present disclosure, it is possible to provide an analysis system and an analysis method that enable more accurate analysis for analyzing correlations between operational data and a defect that has occurred in a manufactured product or a cause of a defect that has occurred during manufacture.

BRIEF DESCRIPTION OF THE DRAWINGS

In the accompanying drawings:

FIG. 4 is a flowchart illustrating an example of the process performed by the analysis system in FIG. 3.

DETAILED DESCRIPTION

Embodiments of the present disclosure will be described in detail below with reference to the drawings.

First Embodiment

Figure 1:
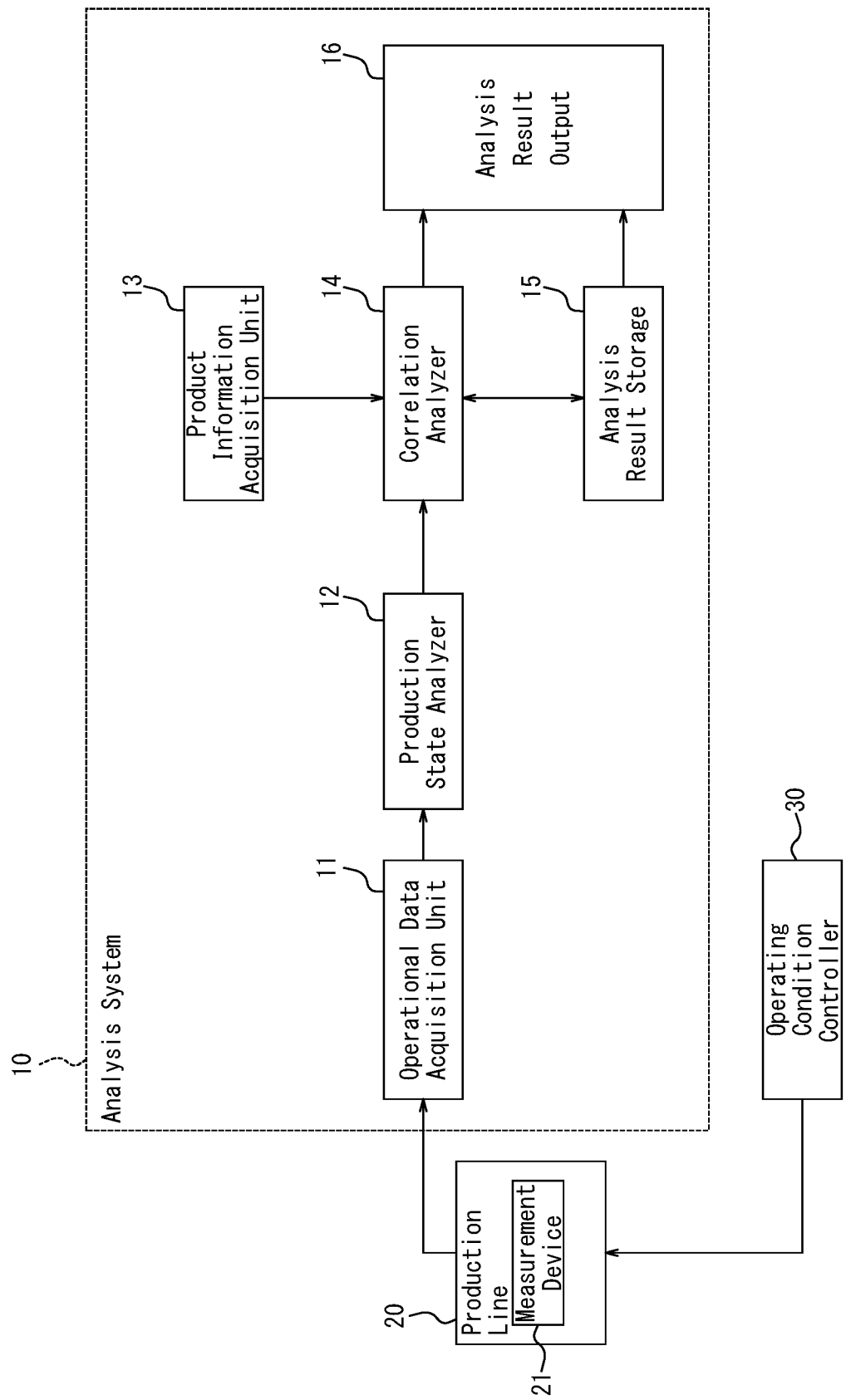
FIG. 1 is a functional block diagram illustrating a schematic configuration of the analysis system according to a first embodiment of the present disclosure.

FIG. 1 is a functional block diagram illustrating a schematic configuration of an analysis system 10 according to a first embodiment of the present disclosure. As illustrated in FIG. 1, an analysis system 10 comprises an operational data acquisition unit 11, a production state analyzer 12, a product information acquisition unit 13, a correlation analyzer 14, an analysis result storage 15, and an analysis result output 16.

The analysis system 10 is configured by an information processing device such as a computer. The analysis system 10 may be configured by a single information processing device, or two or more information processing devices. When the analysis system 10 is configured by a single information processing device, the operational data acquisition unit 11, the production state analyzer 12, the product information acquisition unit 13, the correlation analyzer 14, the analysis result storage 15, and the analysis result output 16 illustrated in FIG. 1 are provided in the single information processing device. When the analysis system 10 is configured by two or more information processing devices, the operational data acquisition unit 11, the production state analyzer 12, the product information acquisition unit 13, the correlation analyzer 14, the analysis result storage 15, and the analysis result output 16 are provided in at least one of the two or more information processing devices. For example, when the analysis system 10 is configured by three information processing devices, a first information processing device may be provided with the operational data acquisition unit 11 and the production state analyzer 12, a second information processing device may be provided with the product information acquisition unit 13 and the correlation analyzer 14, and a third information processing device may be provided with the analysis result storage 15 and the analysis result output 16. However, this configuration is only one example. Each functional part of the analysis system 10 may be provided in an appropriate information processing device according to, for example, the processing that each information processing device performs.

The operational data acquisition unit 11 acquires operational data of the production line 20.

In this case, the production line 20 is a line in which a predetermined operation is performed. The production line 20 may be, for example, a production line installed in a factory. In this case, the production line 20 is operated to manufacture products. The production line 20 comprises a plurality of production devices. Hereinafter, in this embodiment, the production line 20 will be described as a production line for manufacturing products.

As used herein, products are not limited to finished products, but also include products in the course of being manufactured (hereinafter also referred to as "semi-finished products").

In the production line 20, a measurement device 21 is installed. The measurement device 21 is a device that measures a predetermined physical quantity. The measurement device 21 may include, for example, but is not limited to, a thermometer to measure temperature, a pressure gauge to measure pressure, a flow meter to measure flow, a load meter to measure load, and an acceleration sensor to detect acceleration. The measurement device 21 is mounted at a suitable position in the production line 20.

The operational data acquired by the operational data acquisition unit 11 includes data relating to the operational state of the production line 20. The operational data includes, for example, data measured with the measurement device 21 during operation of the production line 20. The operational data acquisition unit 11 acquires, directly or indirectly, data measured with the measurement device 21 (i.e., operational data). In the case of directly acquiring operational data, the operational data acquisition unit 11 is, for example, communicatively connected to the measurement device 21, and acquires the operational data measured with the measurement device 21 by directly receiving the operational data from the measurement device 21. Alternatively, in the case of indirectly acquiring operational data, the measurement device 21 is communicatively connected to a server or the like that collects operational data, and transmits the operational data thereto. The operational data acquisition unit 11 is also communicatively connected to the server or the like and can acquire the operational data indirectly from the server or the like. Accordingly, the operational data acquisition unit 11 comprises a communication interface and the like used to communicate with the measurement device 21 or the server or the like.

The operational data may include data relating to objects to be manufactured in the production line 20 (e.g., raw material and a semi-finished product). The data relating to the objects to be manufactured in the production line 20 may include, for example, the type and chemical composition of raw material to be manufactured and the size and weight of a semi-finished product. The operational data may also include the operating conditions set for the production line 20.

The operational data acquisition unit 11 outputs the acquired operational data to the production state analyzer 12.

The production state analyzer 12 obtains a predetermined physical quantity of the product on a basis of the operational data acquired by the operational data acquisition unit 11, and outputs the information on the obtained physical quantity to the correlation analyzer 14. As used herein, a predetermined physical quantity refers to a numerical value or its distribution obtained by numerical calculation using a physical model on a basis of operational data. Specifically, in this embodiment, the production state analyzer 12 performs numerical analysis on a basis of the operational data acquired by the operational data acquisition unit 11, using a physical model, to obtain information on a predetermined physical quantity. The production state analyzer 12 outputs the results of the performed numerical analysis as information on the predetermined physical quantity. In other words, the production state analyzer 12 outputs values as the results of the numerical analysis. In this respect, the values as the results of the numerical analysis may include a distribution of the results.

As mentioned earlier, operational data does not always show a direct relationship to product information. Therefore, based on the operational data, numerical analysis using a physical model can be used to infer predetermined physical quantities that cannot be directly measured or are not observable in the measurement. As the numerical analysis, the finite difference method, finite element method (FEM), finite volume method (FVM), particle method (SPH, MPS), lattice Boltzmann method (LBM), and other known numerical methods can be used. The production state analyzer 12 comprises, for example, a processor capable of executing numerical analysis. The production state analyzer 12 is composed of a processor such as a central processing unit (CPU) that executes a program that specifies an execution procedure for numerical analysis. Such a program is stored, for example, in a storage provided in the analysis system 10 or in an external storage medium or the like.

The physical model is constructed in advance according to a predetermined physical quantity to be inferred subject to execution of the numerical analysis, and is stored, for example, in a storage provided in the analysis system 10 or in an external storage medium. Various models such as elasto-plastic analysis models for structural analysis, Navier-Stokes equations for thermo-fluid analysis, and Maxwell's equations for electromagnetic field analysis, can be used as appropriate for the physical model, depending on the predetermined physical quantity.

In this embodiment, the production state analyzer 12 calculates, by means of numerical analysis, physical quantities that are difficult to measure with the measurement device 21 as predetermined physical quantities to be inferred subject to execution of the numerical analysis. The physical quantities that are difficult to measure with the measurement device 21 may include physical quantities that cannot be directly measured with the measurement device 21 or that are not observable in the measurement. Examples of the physical quantities that cannot be directly measured with the measurement device 21 include the internal temperature of a semi-finished product in the course of manufacture of a product. The physical quantities that are difficult to measure with the measurement device 21 may include a physical quantity at a location where the measurement device 21 cannot be installed due to the nature of the production line 20. Further, the physical quantities that are difficult to measure with the measurement device 21 may include a distribution of a predetermined physical quantity. To obtain a distribution of a predetermined physical quantity, it is necessary to measure the physical quantities over the entire range to be measured, but it may not be practical to install a large number of measurement devices due to the nature of the production line 20 or because the cost of installing a large number of measurement devices would be enormous. Therefore, a distribution of a physical quantity may be included in the physical quantities that are difficult to measure with the measurement device 21, as described above.

The production state analyzer 12 outputs the results of the numerical analysis to the correlation analyzer 14.

The product information acquisition unit 13 acquires the state of the product manufactured in the production line 20 when the operational data is measured with the measurement device 21, and outputs the acquired information on the state of the product as product information to the correlation analyzer 14. The product information includes any information on the state of the product. The product information may include, for example, information on the quality of the product. The information on the quality of the product may include, for example, information on the size, weight, and strength of the product, information on the chemical composition of the product, information on defects found in the product (e.g., cracks, fracture, etc.), and the like. The product information may be, for example, the results of an inspection by a particular inspection device or other equipment, or the results of an inspection including visual inspection by a worker or the like.

The product information is not limited to information on the state of the finished product, but may also include information on the state of a semi-finished product in the course of manufacture. The product information should include information on the state of the product after some processing (working) is performed by at least one particular device in the production line 20.

When an inspection is performed by an inspection device, the product information acquisition unit 13 is communicatively connected to the inspection device and acquires product information as an inspection result from the inspection device. For example, when an inspection is performed by a human such as a worker, the product information acquisition unit 13 may obtain the product information as an inspection result by accepting an input of the information on the inspection result. In this case, the product information as the inspection result is input by a worker, for example, using an input device such as a keyboard or a touch panel. The input device may be provided in the analysis system 10 or in an external device capable of communicating with the analysis system 10.

The product information acquisition unit 13 outputs the acquired product information to the correlation analyzer 14.

The correlation analyzer 14 analyzes the correlation between the information on a predetermined physical quantity obtained from the production state analyzer 12 and the product information obtained from the product information acquisition unit 13. In this embodiment, the correlation analyzer 14 analyzes the correlation between the results of the numerical analysis obtained from the production state analyzer 12 and the product information obtained from the product information acquisition unit 13. In other words, the correlation analyzer 14 performs statistical analysis on the results of the numerical analysis and the product information. At this time, the correlation analyzer 14 may, if necessary, further acquire data measured with the measurement device 21 from the operational data acquisition unit 11 or the measurement device 21 installed in the production line 20, and perform statistical analysis. The correlation analyzer 14 is configured by, for example, a processor capable of executing statistical analysis. The correlation analyzer 14 may be configured by a processor such as a CPU that executes a program that specifies an execution procedure of the statistical analysis. Such a program is stored, for example, in a storage provided in the analysis system 10 or in an external storage medium or the like.

For statistical analysis, known statistical analysis methods can be used. For example, multiple regression analysis, regression analysis, neural network model, and other statistical analysis can be used to analyze the correlation between the operational state of the production line 20 during operation of the production line 20 and the products manufactured in the production line.

In the analysis system 10 according to this embodiment, the results of the numerical analysis obtained from the production state analyzer 12 include various calculation results of the product or semi-finished product. In the correlation analyzer 14, statistical analysis is performed between these various calculation results and the product information, respectively, to investigate the existence of a correlation, and the result of the numerical analysis that shows the highest correlation with the product information can be known. In other words, compared to the case where numerical analysis is not performed, it is easier to identify operational factors and operating conditions that may affect the state of the product (hereinafter collectively referred to as "operational factors").

In particular, when a physical quantity that is difficult to measure with the measurement device 21 is calculated by numerical analysis, it becomes possible to perform statistical analysis on various factors including operational factors that cannot be taken into account only by measurement using the measurement device 21. Therefore, when some operational factors that cannot be taken into account only by measurement using the measurement device 21 affect the state of the product, such operational factors can be identified.

The correlation analyzer 14 outputs the results of the statistical analysis. The correlation analyzer 14 may output the results of the statistical analysis, for example, by transmitting the results of the statistical analysis to an external device capable of communicating with the analysis system 10. The correlation analyzer 14 may output the results of the statistical analysis to the analysis result storage 15.

The analysis result storage 15 stores the results of the statistical analysis output from the correlation analyzer 14. The analysis result storage 15 may be configured by, for example, semiconductor memory or magnetic memory. Each time the correlation analyzer 14 performs statistical analysis, it outputs the results of the statistical analysis to the analysis result storage 15. The analysis result storage 15 accumulates the results of the statistical analysis output from the correlation analyzer 14.

The correlation analyzer 14 may use the past analysis results stored in the analysis result storage 15 when performing the statistical analysis. In statistical analysis, the greater the number of data used in the analysis, the greater the accuracy. Therefore, by taking into account the results of statistical analysis of the same product in the past when performing statistical analysis, more accurate statistical analysis results can be obtained, and the identification of operational factors that may affect the state of the product becomes easier.

The analysis result output 16 outputs and displays the results of the statistical analysis. The analysis result output 16 is configured by, for example, a display device such as a liquid crystal display (LCD), an organic electro-luminescence display (OELD), or an inorganic electro-luminescence display (IELD), or a printing machine such as a printer. For example, the analysis result output 16 may acquire the information of the analysis result from the correlation analyzer 14 and display the information of the analysis result, or may acquire the information of the analysis result stored in the analysis result storage 15 and display the information of the analysis result. The analysis result output 16 does not necessarily have to be provided in the analysis system 10, but may be provided in an external device capable of communicating with the analysis system 10. In this case, the analysis system 10 may output and display the results of the statistical analysis, for example, by transmitting the results of the statistical analysis to an external device capable of communicating with the analysis system 10.

It goes without saying that there is no problem even if the analysis result output 16 is provided in the same apparatus as the correlation analyzer 14 and the analysis result storage 15.

Based on the results of the analysis performed by the analysis system 10 in the manner described above, the operating conditions in the production line 20 can be set or changed. The setting or changing of the operating conditions is performed, for example, by the operating condition controller 30.

The operating condition controller 30 sets or changes the operating conditions for the production line 20. The operating condition controller 30 may be configured by, for example, a computing device. For example, an operator such as a user or an administrator of the production line 20 inputs an operation to the operating condition controller 30 to set or change the operating conditions with reference to the information of the analysis results displayed on the analysis result output 16. In this case, the operating condition controller 30 transmits a signal to set or change the operating conditions to the production line 20 on a basis of the operational input.

The operating condition controller 30 is configured by, for example, a processor capable of implementing control to set or change the operating conditions. The operating condition controller 30 is configured by a processor such as a CPU that executes a program that specifies an execution procedure of the control to set or change the operating conditions. Such a program is stored, for example, in a storage provided in the computer apparatus constituting the operating condition controller 30 or in an external storage medium or the like.

The operating condition controller 30 specifically transmits a signal to the production line 20 to set or change the operating conditions set for the production line 20. At the production line 20, the operating conditions are set on a basis of the signals, and the production line 20 operates under the set operating conditions.

As described above, as a result of the statistical analysis, the correlation analyzer 14 obtains the result of the numerical analysis that shows the highest correlation with the product information. Since the results of the numerical analysis are obtained on a basis of the operational data, the operating conditions that should be changed can be known by referring to the results of the numerical analysis.

The operating condition controller 30 transmits a signal to set or change the operating conditions for the production line 20 by an operator such as a user or an administrator of the production line 20 so that the quality of the product is improved on a basis of the results of the statistical analysis obtained by the correlation analyzer 14. For example, the operating condition controller 30 may automatically set the operating conditions on a basis of the results of the statistical analysis. When the operating conditions are set or changed so as to improve the quality of the product, the quality of the product manufactured in the production line 20 is improved by, for example, reducing the possibility of manufacturing a defective product, or by manufacturing a higher quality product. In this way, the analysis system 10 makes it possible to improve the operation of the production line 20 as well as to improve the quality of the product.

The operating condition controller 30 may automatically set the operating conditions on a basis of the results of the statistical analysis. In this case, the operating condition controller 30 may be configured as one of the components of the analysis system 10. In other words, the analysis system 10 may include, as one functional part, the operating condition controller 30 that automatically sets the operating conditions.

In the case where the analysis system 10 disclosed herein is utilized for investigating the cause of a trouble during manufacture, the product information acquisition unit 13 may be read as, for example, a trouble information acquisition unit, since the product information acquisition unit 13 can be used to acquire the details of the trouble.

Next, an example of the processing performed by the analysis system 10 will be described with reference to the flowchart in FIG. 2.

First, the operational data acquisition unit 11 acquires operational data for the production line 20 (step S1).

The production state analyzer 12 performs numerical analysis using a physical model on a basis of the operational data acquired by the operational data acquisition unit 11 in step S1 (step S2).

In addition, the product information acquisition unit 13 acquires product information (step S3).

Then, the correlation analyzer 14 performs statistical analysis on a basis of the results of the numerical analysis in step S2 and the product information acquired in step S3 (step S4). Specifically, the correlation analyzer 14 analyzes the correlation between the results of the numerical analysis in step S2 and the product information acquired in step S3.

The analysis result storage 15 stores the results of the statistical analysis in step S4 (step S5). By repeating step S1 to step S5, the results of the statistical analysis are accumulated in the analysis result storage 15.

In addition, the analysis result output 16 outputs the results of the statistical analysis (step S6).

For example, an operator such as a user or an administrator of the production line 20 inputs an operation to the operating condition controller 30 to set or change the operating conditions with reference to the information of the analysis results displayed on the analysis result output 16. The operating condition controller 30 determines the operating conditions for the production line 20 on a basis of the results of the statistical analysis stored in the analysis result storage 15 (step S7). Specifically, the operating condition controller 30 determines the values of the operating conditions for the production line 20.

The operating condition controller 30 outputs a signal to the production line 20 to set or change the operating conditions determined in step S6 (step S8). Upon receipt of the signal, the production line 20 sets or changes the operating conditions specified by the signal and manufactures the product in accordance with the conditions.

The analysis system 10 according to this embodiment can be used in a variety of industrial fields. The following is a concrete explanation with some examples.

For example, the analysis system 10 can be applied to an annealing furnace for annealing steel material. In this case, the production line 20 is an annealing furnace.

In the case of applying the analysis system 10 to an annealing furnace, for example, the operational data acquisition unit 11 acquires, as operational data, information from the production line 20, such as the size and composition of the steel material subject to the production process, the furnace temperature of the annealing furnace, the annealing time, and the heating and cooling rate. The information on the size and composition of the steel material is, for example, information that has been input to the production line 20 in advance by a worker or the like prior to the start of operation of the production line 20. The furnace temperature of the annealing furnace is, for example, the information of the temperature obtained by a thermometer as a measurement device installed in the annealing furnace. The annealing time and the heating and cooling rate are, for example, the operating conditions set for the production line 20.

The production state analyzer 12 performs numerical analysis using a physical model on a basis of the operational data acquired by the operational data acquisition unit 11. The production state analyzer 12 uses numerical analysis to calculate, for example, estimated values of physical quantities such as the temperature distribution in the annealing furnace, the temperature distribution inside the steel material, and the thermal stress on the steel material.

The product information acquisition unit 13 acquires product information on the steel material after annealing.

The product information on the steel material after annealing is, for example, the strength, composition, and shape of the steel material after annealing.

The correlation analyzer 14 performs statistical analysis on a basis of the estimated values of physical quantities calculated by the production state analyzer 12 and the product information acquired by the product information acquisition unit 13. The correlation analyzer 14 may perform statistical analysis using the operational data acquired by the operational data acquisition unit 11 in addition to the estimated values of the physical quantities calculated by the production state analyzer 12. The correlation analyzer 14 identifies an operational factor that has a large impact on the quality of the steel material after annealing by analyzing the correlation between various parameters (physical quantities) and the properties of the steel material after annealing.

The analysis result storage 15 stores the results of the statistical analysis by the correlation analyzer 14. Each time the correlation analyzer 14 performs statistical analysis, the analysis result storage 15 stores the results of the statistical analysis.

For example, when a shape defect occurs in the steel material and the annealing process is suspected as the cause, it is common to examine the temperature in the annealing furnace. However, when the correlation between the shape of the steel and the temperature in the annealing furnace is examined, if the measured temperature in the annealing furnace is within a predetermined range, then it is determined that there is no correlation. Here, based on the measured temperature in the annealing furnace, the temperature rise rate of the steel material can be obtained by numerical analysis, for example, taking into account the thickness and width of the steel material. Then, statistical analysis can be performed to determine if there is a correlation between the shape of the steel material and the temperature rise rate of the steel material. Such a determination cannot be made without numerical analysis. In addition to the temperature rise rate, the maximum arrival temperature of the steel material and the temperature distribution in the steel material can also be obtained by numerical analysis.

Then, statistical analysis is performed to determine if there is a correlation between each of the various calculation results obtained by the numerical analysis and the shape of the steel material, and a calculation result that shows the highest correlation is searched for.

Numerical analysis can be used to supplement the data necessary for statistical analysis, and an operational factor that has a large impact on the quality of the product can be easily identified. If it is determined that the correlation between the temperature rise rate and the shape defect is the highest, the temperature rise rate during annealing can be identified as the cause of a shape defect. At this time, since the effects of the thickness and width of the steel material can also be known by numerical calculation, it is possible to set the operating conditions for each steel material in the production line 20 to prevent shape defects from occurring.

In this way, the analysis system 10 makes it possible to improve the quality of the steel material in annealing. In particular, although it is difficult to directly measure physical quantities of the interior of the steel material at the time of annealing treatment using the measurement device 21, the analysis system 10 makes it possible to calculate estimated values even for the interior of the steel material through the numerical analysis performed by the production state analyzer 12, and to further perform statistical analysis using the estimated values. Therefore, more accurate analysis and control can be achieved compared with the conventional systems.

As another example, for example, the analysis system 10 can be applied in a similar manner to a converter for refining hot metal. Since the interior of the converter is a harsh environment with high temperature, it is difficult to directly measure physical quantities using the measurement device 21. For example, the physical quantities measured with the measurement device 21 for the molten steel to be discharged and the exhaust gas to be discharged from the converter are acquired as operational data. Based on the operational data, the production state analyzer 12 calculates, using a physical model, estimated values of the molten steel surface velocity of the top blowing jet, the reaction area (i.e., the interface area of molten steel) in the converter, the amount of adhesion of metal in the converter, the secondary combustion efficiency of the converter, and the like. The state of the molten steel after the completion of refining (product information on the molten steel) can be acquired by the product information acquisition unit 13. The correlation analyzer 14 performs statistical analysis using these estimated values, which are the results of numerical analysis, and product information on the molten steel after refining, such as refining efficiency (decarburization rate), for example. The operating condition controller 30 controls the operating conditions in the converter according to the operational input by an operator such as a user or an administrator on a basis of the results of the statistical analysis by the correlation analyzer 14. Thus, according to the analysis system 10, even in a converter where it is difficult to measure physical quantities due to the harsh environment, estimated values can be calculated by numerical analysis, and statistical analysis can be performed using the estimated values. In the converter, since the results after the refining process may also vary due to variations in the composition and temperature of the molten steel fed into the converter, the control can be performed with higher accuracy by determining the operating conditions on a basis of the accumulated results of statistical analysis performed more than once.

As another example, for example, the analysis system 10 can be applied in a similar manner to a heating furnace for heating an object such as a metal. In a heating furnace, for example, an object is heated using a burner, a radiant tube, or the like where it is generally difficult to directly measure the temperature distribution of the object being heated (hereinafter referred to as the "target object") using the measurement device 21. However, by performing numerical analysis in the analysis system 10, the temperature distribution of the target object can be estimated. For example, the production state analyzer 12 estimates the temperature distribution of the target object when it is heated by performing numerical analysis using, as the operational data, the temperature of the target object and the temperature in the furnace when the target object is charged into the furnace, the size of the target object, the material of the target object, the outside temperature, and so on. The correlation analyzer 14 performs statistical analysis on a basis of the estimated values as the results of the numerical analysis and the quality of the product after heating. The operating condition controller 30 controls the operating conditions in the heating furnace according to the operational input by an operator such as a user or an administrator on a basis of the results of the statistical analysis. In the heating furnace, the microstructure formation state of the product after heating may be poor depending on the heating state, but numerical analysis and statistical analysis by the analysis system 10 make it easier to identify the operational factors that have a significant effect on the microstructure formation state.

As another example, for example, the analysis system 10 can be applied in a similar manner to a device that performs forming by machining. For example, in forming by machining, it is difficult to directly measure the stress and strain to which the object to be machined (hereinafter referred to as the "workpiece") is subjected using the measurement device 21, and it is even more difficult to measure the stress distribution of the workpiece. However, the stress distribution of the workpiece can be estimated by performing numerical analysis in the analysis system 10. In addition, by performing statistical analysis on a basis of the estimated stress distribution and the quality of the workpiece after machining, it is possible to correlate the stress applied to the workpiece in the machining process with the machining accuracy of the product after machining. Such analysis facilitates the identification of operational factors that affect the quality of the machining process, for example, among operational factors that include the working load, the working speed, and the size of the tools used in machining.

The examples described above are only some of the examples to which the analysis system 10 can be applied. The analysis system 10 can also be applied to operating lines other than the examples described above.

Second Embodiment

In the first embodiment, it has been explained that the production state analyzer 12 executes numerical analysis using a physical model, and the correlation analyzer 14 analyzes the correlation between the results of the numerical analysis and the product information. However, the processing performed by the production state analyzer 12 and the correlation analyzer 14 is not so limited. The second embodiment describes an example in which the production state analyzer 12 and the correlation analyzer 14 perform processing different from the first embodiment. The analysis system according to the second embodiment will be described below, omitting points similar to those of the first embodiment as appropriate.

Figure 3:
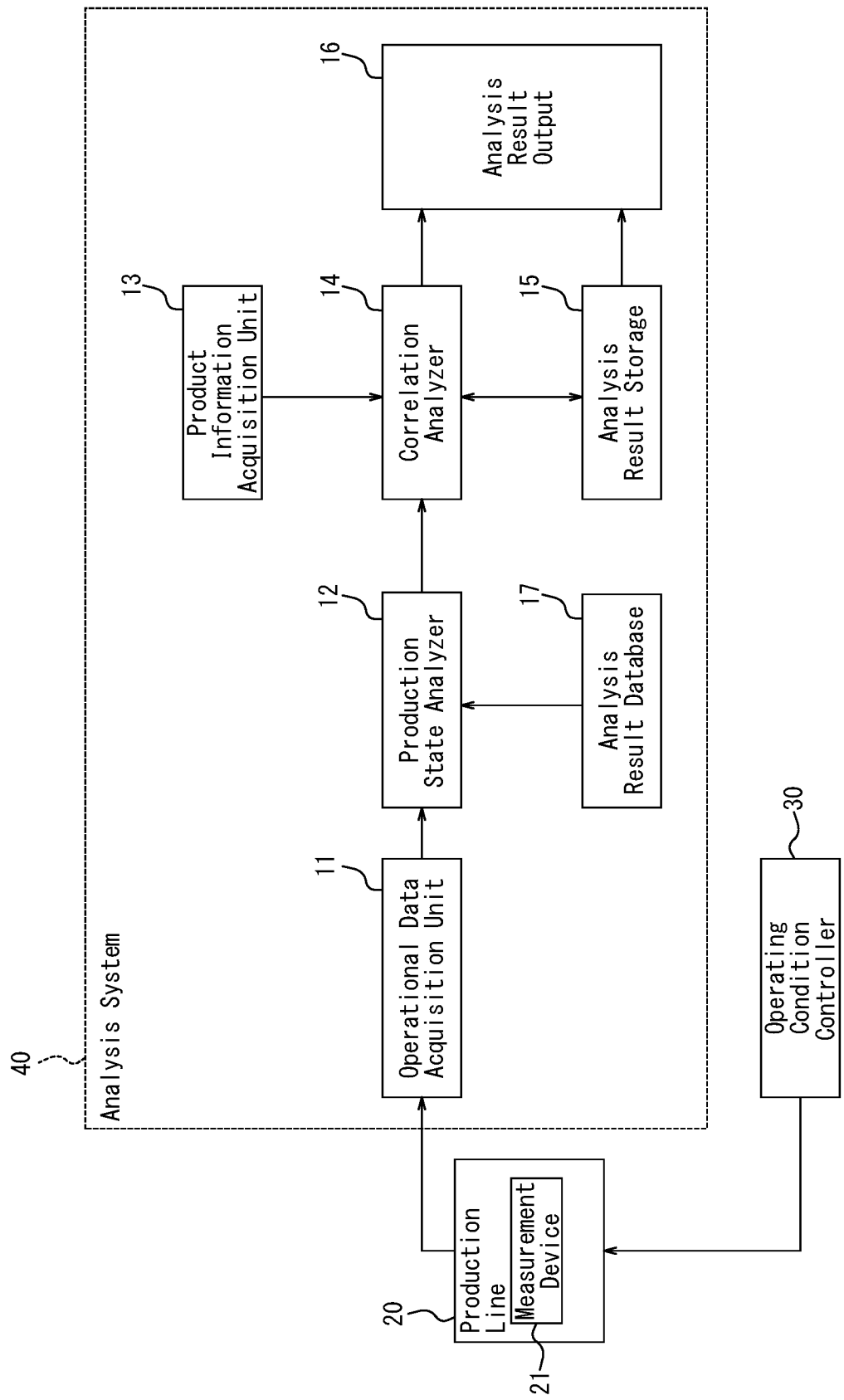
FIG. 3 is a functional block diagram illustrating a schematic configuration of the analysis system according to a second embodiment of the present disclosure.

FIG. 3 is a functional block diagram illustrating a schematic configuration of an analysis system 40 according to the second embodiment of the present disclosure. As illustrated in FIG. 3, the analysis system 40 according to the second embodiment comprises an operational data acquisition unit 11, a production state analyzer 12, a product information acquisition unit 13, a correlation analyzer 14, an analysis result storage 15, an analysis result output 16, and an analysis result database 17. In this embodiment, the configurations and functions of the operational data acquisition unit 11, the product information acquisition unit 13, the analysis result storage 15, and the analysis result output 16 are the same as those of the first embodiment, and therefore detailed description is omitted here. The analysis result database 17 may be provided in the same information processing device as the other functional parts, or in a different information processing device than the other functional parts.

In the analysis system 40 according to this embodiment, in performing analysis of a correlation between the information on the values of a predetermined physical quantity at the time of operation and the product information obtained from the product information acquisition unit 13, the results of numerical analysis are stored in the analysis result database 17 in advance. The results of numerical analysis to be stored in the analysis result database 17 are the results of numerical analysis for a predetermined physical quantity performed using a physical model on a basis of the operational data of the production line 20. In other words, the production line 20 is operated in advance, and based on the operational data at this time, a numerical analysis process is performed for a predetermined physical quantity using a physical model by means of the analysis system 40 or other computing devices. The numerical analysis may be performed using, for example, the finite difference method, finite element method, finite volume method, particle method, lattice Boltzmann method, and other known numerical methods, as also described in the first embodiment.

The analysis result database 17 stores the results of numerical analysis performed more than once. The results of numerical analysis performed more than once are the results of numerical analysis performed on a basis of the operational data obtained when the production line 20 is operated under different operating conditions. It is preferable that the results of the numerical analysis be based on the operational data obtained during operation under a variety of operating conditions. Consequently, the results of the numerical analysis under a variety of conditions are stored in the analysis result database 17. In this way, the analysis result database 17 stores in advance the results of the numerical analysis for a predetermined physical quantity, which is performed using a physical model on a basis of the operational data of the production line 20.

In this embodiment, the production state analyzer 12 determines information on a predetermined physical quantity on a basis of the operational data acquired by the operational data acquisition unit 11, using the results of the numerical analysis stored in the analysis result database 17. The production state analyzer 12 may use the results of the numerical analysis stored in the analysis result database 17 to determine the information on the values at the time of operation by any method such that the information on a predetermined physical quantity is in a range estimated to indicate the state of operation of the operational data acquired by the operational data acquisition unit 11. The range estimated to indicate the state of operation of the operational data acquired by the operational data acquisition unit 11 includes not only the physical quantity (numerical value) at the time of operation of the operational data acquired by the operational data acquisition unit 11, but also physical quantities (numerical values) within a predetermined range from that physical quantity. The information on the value at the time of operation may be indicated by a numerical value. The information on the value at the time of operation may be presented as a numerical range.

For example, the production state analyzer 12 may refer to the results of the numerical analysis stored in the analysis result database 17 on a basis of the operational data acquired by the operational data acquisition unit 11, and determine the result of the numerical analysis under the conditions closest to the conditions of the operational data acquired by the operational data acquisition unit 11, among the results of the numerical analysis stored in the analysis result database 17, as the information on the values at the time of operation. Alternatively, the production state analyzer 12 may, based on the operational data acquired by the operational data acquisition unit 11, refer to the results of the numerical analysis stored in the analysis result database 17, perform a weighted operation on each of the results of the numerical analysis stored in the analysis result database 17, and determine the value obtained as a result of the weighted operation as the information on the value at the time of operation. The weighting can be performed by giving greater weight to the results of the numerical analysis under conditions closer to the conditions of the operational data acquired by the operational data acquisition unit 11 among the results of the numerical analysis stored in the analysis result database 17. The size of the weights by weighting is represented by coefficients. Accordingly, the weighting is performed by multiplying the numerical values as the results of numerical analysis stored in the analysis result database 17 by the respective predetermined coefficients. The method of determining the information on the values at the time of operation is not limited to the one disclosed herein.

The production state analyzer 12 outputs the determined information on the predetermined physical quantity to the correlation analyzer 14.

The correlation analyzer 14 analyzes the correlation between the information on the values at the time of operation obtained from the production state analyzer 12 and the product information obtained from the product information acquisition unit 13. At this time, as in the first embodiment, the correlation analyzer 14 may further acquire, if necessary, data measured with the measurement device 21 from the operational data acquisition unit 11 or the measurement device 21 installed in the production line 20, and perform statistical analysis. Since the details of the correlation analysis process performed by the correlation analyzer 14 may be the same as in the first embodiment, the detailed description is omitted here.

FIG. 4 is a flowchart illustrating an example of a process performed by the analysis system 40 in FIG. 3. At the start of the flow in FIG. 4, the results of numerical analysis performed more than once are stored in advance in the analysis result database 17.

Figure 2:
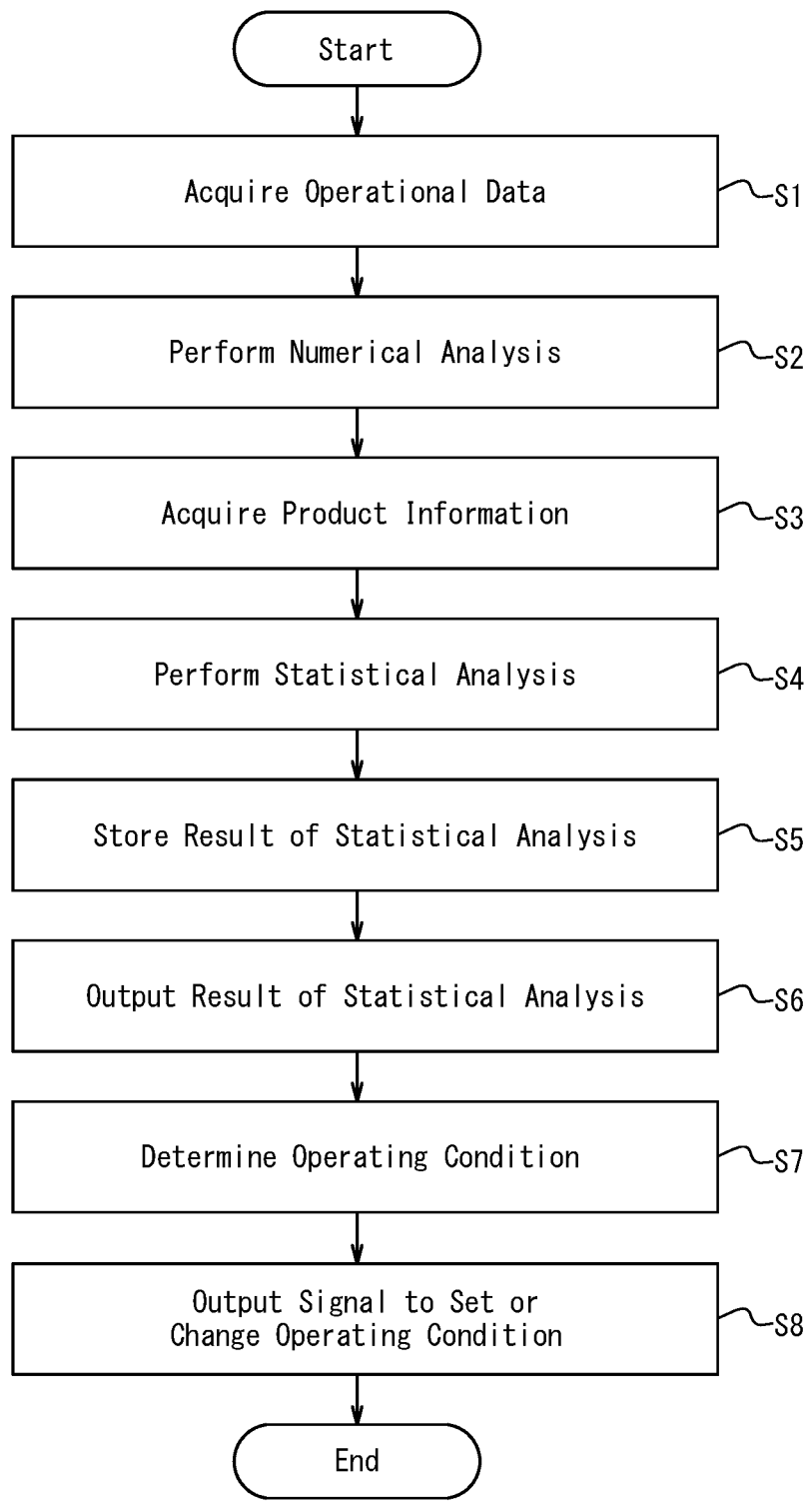
FIG. 2 is a flowchart illustrating an example of the process performed by the analysis system in FIG. 1.

The flow in FIG. 4 differs from the flow in FIG. 2 described in the first embodiment in that step S2 is replaced by step S12, and is common in other respects.

Specifically, in this embodiment, the production state analyzer 12 determines information on the values at the time of operation with reference to the results of numerical analysis stored in the analysis result database 17 on a basis of the operational data acquired by the operational data acquisition unit 11 in step S1 (step S12). The production state analyzer 12 outputs the determined information on the predetermined physical quantity to the correlation analyzer 14.

The correlation analyzer 14 performs statistical analysis in step S4. In this embodiment, specifically, the correlation analyzer 14 analyzes the correlation between the information on the values at the time of operation obtained from the production state analyzer 12 and the product information obtained from the product information acquisition unit 13.

With the analysis system 40 according to this embodiment, the results of numerical analysis performed more than once are stored in advance in the analysis result database 17, and when the correlation analysis process is performed, the numerical analysis described in the first embodiment are not performed, but instead the information on the predetermined physical quantity is determined with reference to the results of the numerical analysis stored in the analysis result database 17. In general, numerical analysis require time for calculation. However, as in this embodiment, by storing the results of numerical analysis in the analysis result database 17 in advance and by performing analysis of correlations with reference to the analysis result database 17, correlations can be analyzed in a more real-time manner.

The analysis system 40 according to the second embodiment is also applicable to the above-described annealing furnace, converter, heating furnace, and devices for forming by machining.

The analysis system 10 according to the above embodiments is also applicable to the maintenance of the production line 20. For example, the analysis system 10 obtains information on the state of the production line 20 after the start of operation (e.g., rotation speed of rotating parts, load received by the parts, load current, and operating time), and performs statistical analysis on a basis of the results of numerical analysis and the information on the state of the production line 20 after the start of operation. Statistical analysis can be used to identify, for example, an operational factor that affects the degradation of the production line 20. Depending on the results of the statistical analysis, the production line 20 can be operated under conditions that are less likely to degrade the production line 20.

Although the present disclosure has been described above with reference to the drawings and examples, it should be noted that a person skilled in the art can easily make various variations and modifications based on the present disclosure. Accordingly, it is noted that these variations and modifications are also within the scope of the present disclosure. For example, the functions included in each means, step, and the like can be rearranged so as not to contradict each other logically, and multiple means, steps, and the like can be combined into one or divided.

REFERENCE SIGNS LIST 10 analysis system
11 operational data acquisition unit
12 production state analyzer
13 product information acquisition unit
14 correlation analyzer
15 analysis result storage
16 analysis result output
17 analysis result database
20 production line
21 measurement device
30 operating condition controller

The invention claimed is:

1. An analysis system comprising:
an operational data acquisition unit that acquires operational data including an operational state of a production line;
a product information acquisition unit that acquires a state of a product manufactured in the production line and outputs the state of the product as product information;
a production state analyzer that obtains a predetermined physical quantity of the product on a basis of the operational data acquired by the operational data acquisition unit and outputs the predetermined physical quantity as information on the predetermined physical quantity;
a correlation analyzer that performs analysis of a correlation between the information on the predetermined physical quantity and the product information; and
an analysis result database that stores a result of numerical analysis of the predetermined physical quantity executed in advance using a physical model on a basis of the operational data of the production line, wherein
the production state analyzer executes numerical analysis of the predetermined physical quantity using the physical model on a basis of the operational data acquired by the operational data acquisition unit, and outputs a result of the executed numerical analysis as information on the predetermined physical quantity, and
the production state analyzer determines the information on the predetermined physical quantity using the result of the numerical analysis stored in the analysis result database on a basis of the operational data acquired by the operational data acquisition unit, and outputs the information on the predetermined physical quantity determined.

2. The analysis system according to claim 1, wherein the production state analyzer performs a weighted calculation on each of a plurality of the results of the numerical analysis stored in the analysis result database on a basis of the operational data acquired by the operational data acquisition unit to determine the information on the predetermined physical quantity.

3. The analysis system according to claim 1, further comprising an analysis result storage that stores a result of the analysis of the correlation by the correlation analyzer.

4. The analysis system according to claim 1, wherein the product information includes information on the quality of the product.

5. The analysis system according to claim 1, wherein the production state analyzer and the correlation analyzer are mounted on different independent devices.

6. The analysis system according to claim 1, wherein the production state analyzer and the correlation analyzer are mounted on a single device.

7. An analysis method executed by an analysis system comprising:
acquiring operational data including an operational state of a production line;
acquiring a state of a product manufactured in the production line;
outputting the state of the product as product information;
obtaining a predetermined physical quantity of the product on a basis of the operational data acquired;
outputting the predetermined physical quantity as information on the predetermined physical quantity; and
performing analysis of a correlation between the information on the predetermined physical quantity and the product information, wherein
the outputting the predetermined physical quantity comprises executing a numerical analysis of the predetermined physical quantity using a physical model on a basis of the operational data acquired and outputting a result of the executed numerical analysis as information on the predetermined physical quantity,
the outputting the predetermined physical quantity determines the information on the predetermined physical quantity using a result of the numerical analysis stored in an analysis result database on a basis of the operational data acquired, and outputs the information on the predetermined physical quantity determined, wherein
the analysis result database stores the result of numerical analysis of the predetermined physical quantity executed in advance using the physical model on a basis of the operational data of the production line.

8. The analysis system according to claim 1, further comprising:
an operating condition controller that transmits a signal to set or change operating conditions for a production line on a basis of the result output from the correlation analyzer.

9. The analysis method executed by an analysis system according to claim 7, further comprising:

transmitting a signal to set or change operating conditions for a production line on a basis of the result output from the performing analysis.

* * * * *